Patented Aug. 12, 1924.

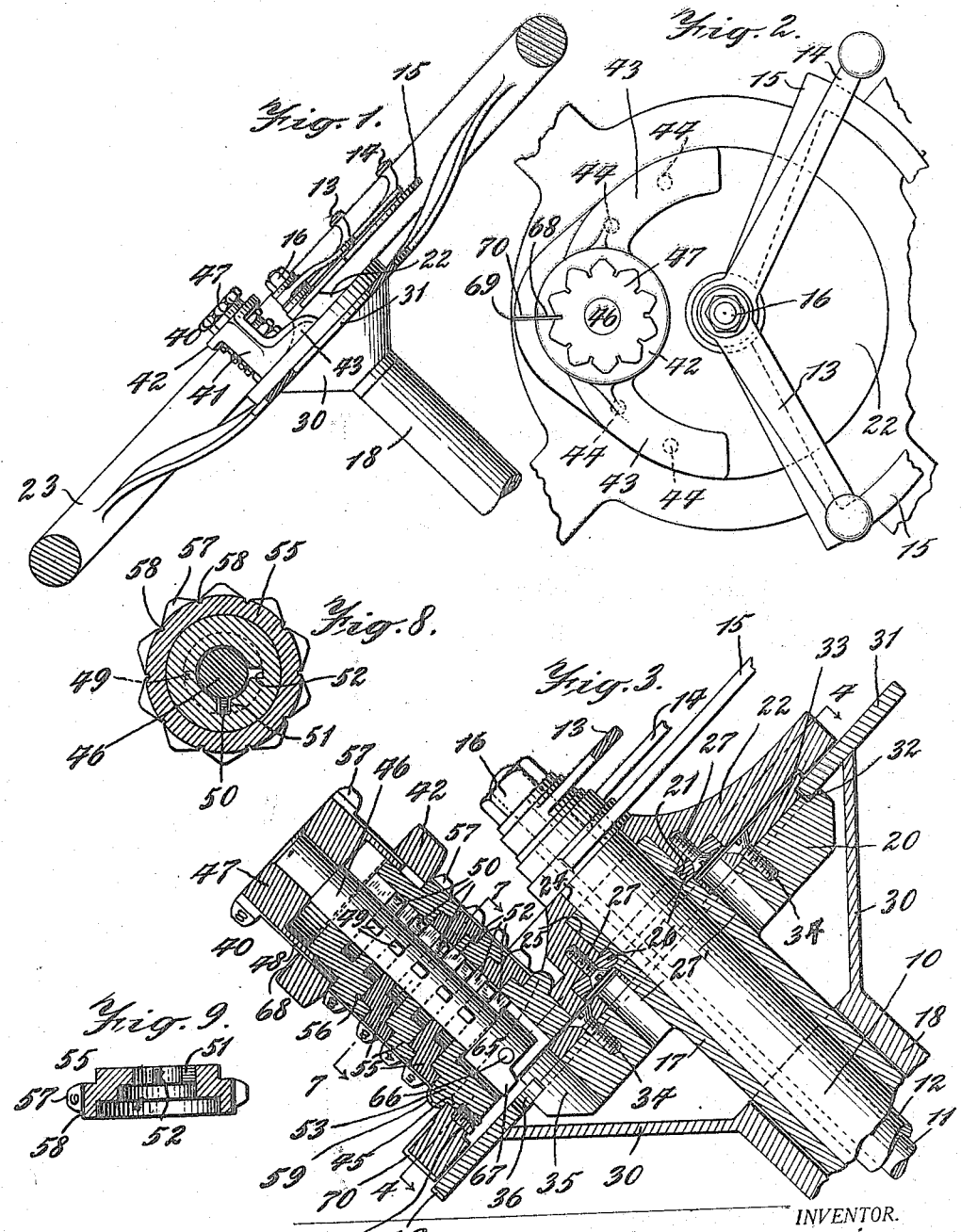

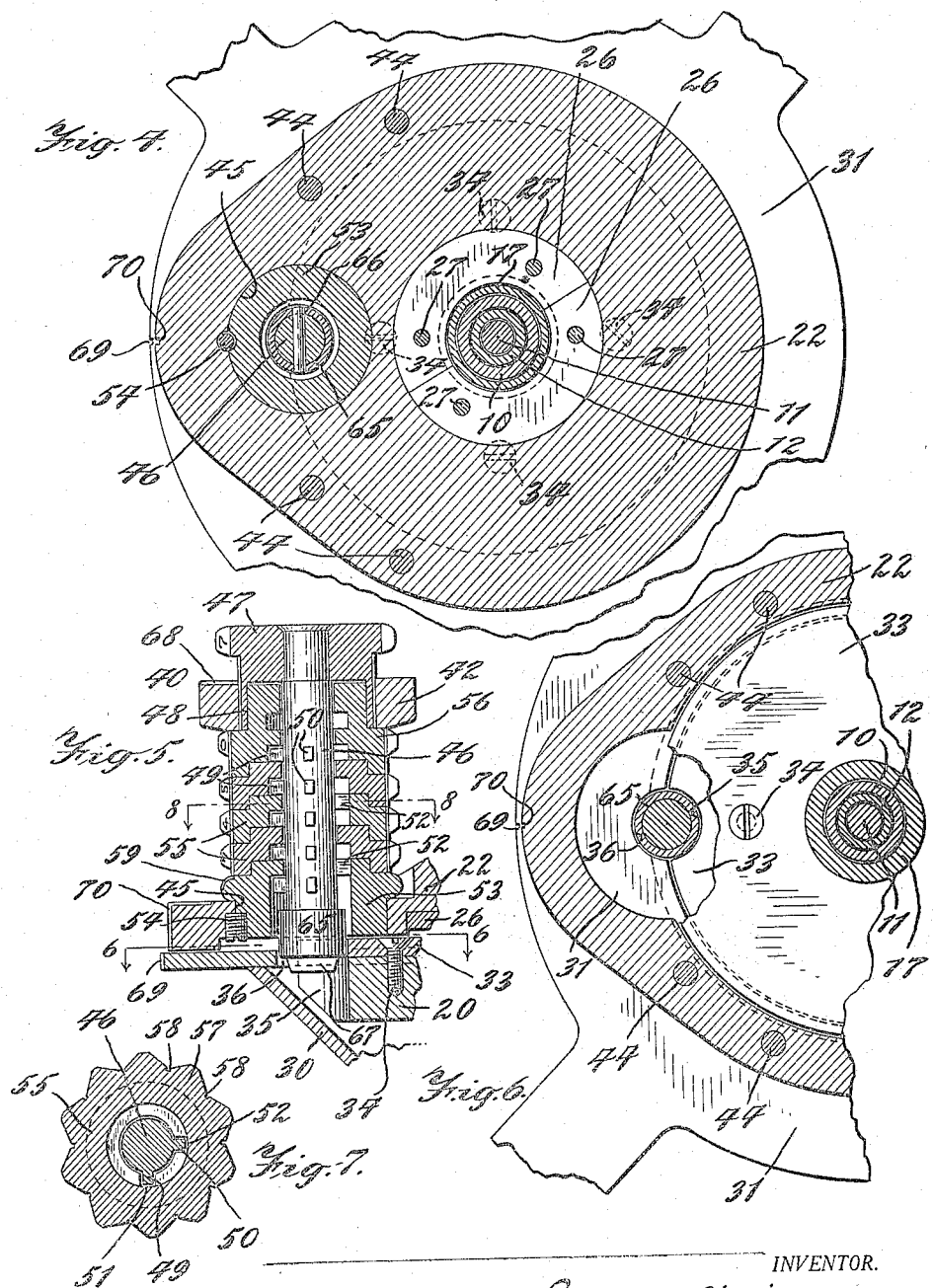

1,504,214

UNITED STATES PATENT OFFICE.

GANDOLFO CIPRIANO, OF NEW YORK, N. Y.

STEERING-WHEEL LOCK.

Application filed November 17, 1920. Serial No. 424,655.

*To all whom it may concern:*

Be it known that I, GANDOLFO CIPRIANO, a citizen of the United States, residing at New York city, borough of Richmond, county of Richmond, and State of New York, have invented certain new and useful Improvements in Steering-Wheel Locks, fully described and represented in the following specification and the accompanying drawings, forming a part of the same.

This invention relates to steering wheel locks and has for an object the providing of a lock by means of which the steering wheel of an automobile, motor boat, or other vehicle may be disconnected from the steering gear so as to render it impossible to operate the vehicle and thus prevent its theft.

My lock is especially adapted for use in connection with the steering wheels of automobiles. Locks have been provided for connecting and disconnecting an automobile steering wheel and the steering gear, but so far as I am aware in all devices of this character some member constituting part of the steering mechanism or connected therewith has been left uncovered when the steering wheel is disconnected. These devices have, therefore, not proved thief-proof as the uncovered member of the steering mechanism, which is often in the form of a post projecting through the middle of the steering wheel, may be grasped, as, for example, with a monkey wrench, and operated even when the wheel is unlocked. In accordance with my invention, the steering mechanism is completely covered by parts not connected with it when the wheel is unlocked, so that there is no way in which the steering mechanism can be reached and operated. In the form of my invention which I now consider most desirable, the upper end of the steering mechanism is protected by a cover, and both the cover and the steering wheel are free to rotate independently of each other and of the steering mechanism when unlocked. A lock is provided for connecting together the cover, the wheel and the steering gear so that they all rotate together when the device is locked.

A further disadvantage of the locks heretofore provided for automobile steering wheels has been in the trouble and difficulty experienced in locking the wheel to the steering mechanism. In all such locks it has been necessary to set the steering wheel in definite relation to the steering gear in order to operate the lock so as to connect the wheel to the steering gear. As the steering gear is unlikely to remain in this definite relation to the steering gear when unlocked, difficulty has been experienced in these devices in relocking the wheel to the steering gear. In my device, this difficulty is overcome and the lock may be set and operated regardless of the relative position of the steering wheel and steering gear, the connection between these parts being effected after the operation of the locking device. By this means I have provided a lock which is practical and convenient in use.

A further advantage of my invention lies in the arrangement which I have devised which makes it impossible to remove or tamper with the locking mechanism unless the entire steering gear be removed from the vehicle.

Other objects and advantages of the invention will be pointed out in connection with a detailed description of the specific embodiment of the invention which is shown in the accompanying drawings, in which Fig. 1 is a side view of an automobile steering wheel provided with my lock and showing a portion of the rim and spokes of the steering wheel broken away;

Fig. 2 is a top view of the central portion of a steering wheel provided with my lock;

Fig. 3 is a sectional elevation of the parts shown in Fig. 2, the section being taken in the plane of the axis of the steering wheel, and showing the lock-bar in position to leave the steering wheel free from connection to the steering mechanism;

Fig. 4 is a section upon the line 4—4 of Fig. 3;

Fig. 5 is a sectional elevation of the lock and associated parts showing the lock-bar in position to connect the steering wheel with the steering mechanism;

Fig. 6 is a fragmentary sectional view taken upon the line 6—6 of Fig. 5;

Fig. 7 is a section taken upon the line 7—7 of Fig. 3;

Fig. 8 is a section taken upon the line 8—8 of Fig. 5; and

Fig. 9 is a sectional elevation of one of the interchangeable locking rings.

In the drawings, 10 is the post fixedly mounted in an automobile. Within the post 10 is a rod 11 and a sleeve 12 connected at their lower ends to mechanism for controlling the supply of gas to the engine and the position of the sparking mechanism. The control levers 13 and 14 are connected to the rod 11 and sleeve 12 respectively and move over an arc 15 which is mounted upon the fixed post 10. A nut 16 screwed on a threaded stud at the upper end of the rod 11 retains the control levers 13, 14, and the arc 15, in position. Surrounding the post 10 is a steering sleeve or hollow shaft 17 connected at its lower end with the steering gear of the automobile, and outside the sleeve 17 is a fixed casing 18.

Near the upper end of the steering sleeve 17 is a disc 20 which is preferably made integral with the sleeve 17 as shown. In the portion of the sleeve 17 above the disc 20 is a circumferential groove 21. A rotatable cover 22 is mounted upon the post 10 and the upper end of the steering sleeve 17. The hole in the center of the cover 22 comprises a portion 24 of such diameter as to form a running fit upon the post 10 and a portion 25 of greater diameter adapted to surround the upper end of the steering sleeve 17. Below the portion 25, the cover is provided with an annular recess in which are seated two semi-circular pieces 26 (Figs. 3 and 4) which are attached to the cover 22 by screws 27. The inner edges of the pieces 26 enter the groove 21 in the sleeve 17 and thus serve to prevent the removal of the steering wheel even though the nut 16, the arc 15, and control levers 13 and 14, be removed from the post. One or more holes 27' are provided in the disc 20 to permit access to the heads of the screws 27.

The upper end of the casing 18 is provided with a flaring portion 30, preferably made integral with it. The hub 31 of the steering wheel 23 covers the top of the portion 30. The inner edge of the hub 31 lies in a circumferential recess 32 at the top of the disc 20. A plate 33 attached to the top of the disc 20 by screws 34 retains the hub 31 in the recess 32. The wheel hub 31 is, however, free to turn relatively to the disc 20 and relatively to the conical portion 30 of the casing 17.

The disc 20 and the plate 33 are provided with a recess in the form of a notch 35 in their peripheries. At one point in its inner edge the wheel hub 31 is provided with a notch 36. When the relative position of the wheel hub 31 and disc 20 is such that the notches 35 and 36 are opposite each other, they form a cylindrical aperture into which a sleeve upon a locking bar carried by the cover 22 enters in a manner hereinafter described.

The locking mechanism 40 is mounted upon the cover 22. The supporting frame 41 of the locking mechanism comprises a ring 42 and extended feet 43 which are attached to the top of the cover 22 near its periphery by screws 44 inserted from the under side of the cover 22, and having a threaded engagement with holes bored into the bottom of the feet 43.

The upper end of the locking mechanism 40 is retained within the ring 42 of the frame 41, while its lower end fits within a circular aperture 45 in the cover 22.

The locking mechanism shown in the drawings comprises a new type of what is usually known as a combination lock. It should be noted, however, that many of the features of my invention are applicable also to use in connection with locking mechanism operated by a key. In the locking mechanism shown, a locking bar 46 is rigidly attached to a ring 47 at its upper end. The ring 47 has a cylindrical flange 48 which fits within the ring 42 of the frame 41. The locking bar 46 is provided with a longitudinally aligned series of projections 49. It may be provided also with other similar series of projections, such as the projections 50 spaced at 90° from the projections 49. Between the ring 42 of the frame 41 and the cover 22 are a series of rings, each provided with slots 51, 52, to permit the passage of the projections 49, 50, when the notches in the rings are aligned and in a certain angular relation to the locking bar 46. The lower one of these rings 53 fits within the hole 45 in the cover 22 and is keyed to the cover by a screw 54. Above the ring 53 are a set of interchangeable rings 55 rotatable relative to the ring 53 and relative to each other. The form of the interchangeable rings 55 is indicated in Fig. 9. The bore of each ring consists of three portions, a lower portion of diameter sufficient to fit over the ring below, an intermediate portion of diameter sufficient to lie outside the ends of the projections 49, 50, and an upper portion of diameter to fit loosely upon the locking bar 46. The upper portion is provided with two slots 51, 52, to permit the passage of the projections 49, 50, when the ring is in a predetermined angular relation to the locking bar 46. Above the interchangeable rings 55 is a ring 56 which differs from the rings 55 in that it is longer and at its bore is provided with two portions which fit upon the locking bar 46, each of which is provided with slots for the passage of the projections 49 and 50. The upper portion of the ring 56 extends within the ring 42 of the frame 41 and fits within the flange 48 of the ring 47. Each of the rings 47, 55, 56, is provided at its periphery with a set of ten tabs 57 separated by grooves 58. The tabs 57 of each ring are serially numbered from zero to nine for a purpose hereinafter explained.

The lower end of the locking bar 46 is provided with a portion 65 of greater diameter than the rest of the bar. For convenience in construction, the portion 65 may be made in the form of a sleeve fitting upon the lower end of the bar 46 and attached to it by a pin or rivet 66. The sleeve 65 is provided at its lower end with a projection 67, the purpose of which is hereinafter explained.

The operation of the device described is as follows:—When the locking bar 46 is in retracted position as shown in Fig. 3, the steering wheel 23, 31, and the cover 22 are free to rotate independently of each other and of the steering sleeve 17. In order to lock the steering wheel to the steering gear, the steering wheel 23 is turned so as to bring the notch 36 in its hub 31 under the projection 67. Such alignment is secured by bringing together the mark 69 on the hub 31 and the mark 70 on the cover 22. The rings 55, 56, are then set into predetermined angular relation with the ring 53. This is done by aligning the tabs 57 of the rings so as to bring in line the series of numbers constituting the combination for the particular lock in question. Exact alignment is secured by bringing the grooves 58 of the rings into alignment with each other and bringing all these grooves into alignment with groove 59 upon the ring 53. This brings the slots 51 and 52 of the rings 53, 55, and 56 into alignment, as shown in Fig. 3. The bar is brought with its projections 49 and 50 into alignment with the aligned slots of the rings 53, 55, 56, by turning the ring 47 so as to bring a predetermined tab in line with the aligned tabs of the other rings, and to bring the groove next to this tab in line with a groove 68 on the ring 42 of the frame 41. If the notch 35 in the disc 20 is in alignment with the bar 46, the parts are then in the position shown in Fig. 3. The bar 46 may then be pushed downward by pressing upon the ring 47, bringing the sleeve 65 into the circular aperture formed by the notches 35 and 36, and locking together the cover 22, the hub 31 and the disc 20. Ordinarily, however, the steering wheel will not be so placed relative to the disc 20 that the notch 35 is under the bar 46. In this case, after the alignment of the notch 36 in the hub 31 with the bar 46 and the alignment of the rings 53, 55, 56, with the projections 49, 50, of the bar, the bar is pushed down until the sleeve 65 rests upon the upper surface of the plate 33. This will permit the projection 67 to enter the notch 36 in the hub 31. It will also place each of the projections 49, 50, in the corresponding slots 51, 52 of one of the rings so that angular displacement of the rings and locking bar cannot occur. The cover 22 and the steering wheel 23, 31 which is locked to it are then turned about the disc 20 by grasping the ring 47. During this movement the ring 47 and consequently the bar 46 are pressed downward by the hand so that, as soon as the position is reached in which the notch 35 in the disc 20 and plate 33 is in alignment with the locking bar 46 and the notch 36 of the hub 31, the sleeve 65 enters the aperture formed by the two notches and locks together the steering wheel, the cover 22, and the disc 20. This brings each of the projections 49, 50 below the notch through which it has passed so that the rings 55, 56 and 47 may be turned so as to bring the slots 51, 52, of each ring out of alignment with the slots of the other rings and out of alignment with the projections 49, 50. The parts are then in the position illustrated in Fig. 5, and the locking bar 46 cannot be raised so as to disconnect the steering wheel from the steering mechanism, except by one knowing the combination of numbers which must be used to align the slots 51, 52, with the projections 49, 50.

When it is desired to unlock the steering wheel from the steering gear, the rings 55, 56 and 47 are aligned with the ring 53 as before by use of the numbered tabs. The ring 47 and bar 46 may then be drawn upwardly into the position shown in Fig. 3, so that the sleeve 65 is out of engagement with the notches 35, 36, and the steering wheel is in consequence free to rotate relatively to the disc 20. When the bar is in this position, each of the projections 49, 50, is above the corresponding slot 51, 52, through which it has passed, so that the bar may be turned relatively to the rings 53, 55, 56, so as to bring the projections 49, 50, out of alignment with the slots 51, 52, and the rings 55, 56, may be turned relatively to each other so as to bring their slots out of alignment. It is then impossible to push down the locking bar 46 without resetting the rings and bar in alignment, and this can be done only by one knowing the combination of numbers. As the car cannot be driven with the steering wheel thus unlocked from the steering gear, theft of the car is prevented. Furthermore, as the steering sleeve 17, which is the only part of the device connected with the steering gear, is completely enclosed by parts not connected with it, it cannot be grasped with a monkey wrench or other instrument which might be used instead of the steering wheel as a means to operate the steering gear.

In order to make the device thief-proof the parts above described have been arranged so as to make it impossible to remove the steering wheel or the lock. The screws 44 which hold the feet of the frame to the cover 22 cannot be removed because their heads are covered by the hub 31 of the steering wheel. The same is true of the screw 54 which holds the ring 53 to the cover 22. The cover 22 and the steering wheel cannot be removed even though the parts mounted above them upon the steering post 10 are removed because the cover is held by the engagement of the semi-circular pieces 26 with the groove 21 in the steering sleeve 17, and access to the screws 27, which hold the pieces 26 is prevented by the casing 18, 30. Furthermore, the heads of the screws 34 which retain the plate 33 in position are covered by the cover 22 so that they cannot be reached. The device cannot be taken apart, therefore, except by raising the steering sleeve 17 within the casing 18 so as to permit access to the screws 27 through the holes 27′ and this can only be done by taking apart the steering mechanism at the lower end of the steering sleeve. The taking apart of this steering mechanism requires considerable time and work. The device is, therefore, thief-proof.

Many modifications may be made in the specific device described without departing from my invention. Thus the locking bar need not be made parallel to the steering post, but may be placed at any desired angle with it. If the locking bar is placed perpendicularly to the steering post the locking mechanism may desirably be supported upon the steering wheel instead of upon the cover.

Furthermore, many of the features of the invention may be retained, though a key operated lock is substituted for the combination lock shown.

What is claimed is:

1. In mechanism for locking steering wheels, the combination of a steering shaft, a steering member fixed on said steering shaft, a fixed casing surrounding the steering shaft, two independently rotatable members which cooperate with said casing to enclose the steering member, and means for locking said rotatable members to the steering member.

2. In mechanism for locking steering wheels, the combination of a steering member, a cover and a steering wheel enclosing the upper end of the steering member and rotatable independently of each other and of the steering member, and locking means arranged to lock the cover and the steering wheel together independently of the steering member and to lock the cover and steering wheel to the steering member.

3. In mechanism for locking steering wheels, the combination of a steering shaft, a fixed casing surrounding the steering shaft, a steering wheel and a cover mounted at the upper end of said steering shaft and rotatable independently of each other and of the steering shaft, said wheel, said cover and said casing being arranged to enclose said steering shaft, and means for locking said steering wheel to said steering shaft.

4. In mechanism for locking steering wheels, the combination of a fixed post, a steering sleeve surrounding the steering post, a fixed casing surrounding the steering sleeve, a steering wheel and a cover mounted at the upper end of said steering sleeve and rotatable independently of each other and of said steering sleeve, said wheel, said cover and said casing being arranged to enclose said steering sleeve, and means for locking said steering wheel to said steering sleeve.

5. In mechanism for locking steering wheels, the combination of a fixed post, a steering sleeve surrounding the steering post, a fixed casing surrounding the steering sleeve, a steering wheel and a cover mounted at the upper end of said steering sleeve and rotatable independently of said steering sleeve, said wheel, said cover and said casing being arranged to enclose said steering sleeve, and means for locking together said cover, said steering wheel and said steering sleeve.

6. In mechanism for locking steering wheels, the combination of a fixed post, a steering sleeve surrounding the steering post, a fixed casing surrounding the steering sleeve, a steering wheel and a cover mounted at the upper end of said steering sleeve and rotatable independently of said steering sleeve, said wheel, said cover and said casing being arranged to enclose said steering sleeve, and a locking bar supported upon said cover and adapted to lock together said cover, said steering wheel and said steering sleeve.

7. In mechanism for locking steering wheels, the combination of a steering member containing an eccentric recess, a fixed casing, and a rotatable steering wheel and cover enclosing said steering member, a longitudinally movable bar adapted to enter said recess in the steering member and lock the steering wheel thereto when the steering wheel and steering member are in a predetermined angular relation, means for locking said bar in retracted position with its end spaced from the surface of the steering member, means for rendering said locking mechanism inoperative when said bar is in intermediate position in engagement with the steering wheel and with its end in contact with the surface of the steering member so that said bar may be moved into alignment with the recess in the steering member by turning the steering wheel.

8. In mechanism for locking steering wheels, the combination of a steering member containing an eccentric recess, a steering wheel and a cover rotatable independently of each other and of the steering member, and enclosing the upper end of the steering member, a longitudinally movable bar mounted upon the cover and adapted to lock together the cover, the steering wheel and the steering member when said parts have a predetermined angular relation, means for locking said bar out of engagement with said steering wheel and steering member, means for rendering said locking mechanism inoperative when said bar is in intermediate position in engagement with said steering wheel and with its end resting upon said steering member so that said bar may be brought in alignment with the recess in the steering member by turning said steering wheel and cover.

9. In mechanism for locking steering wheels, the combination of a steering member, a steering wheel and a cover rotatable independently of each other and of the steering member and enclosing the upper end of the steering member, a longitudinally movable bar mounted upon the cover and adapted to lock together the cover, wheel and steering member when in advanced position, to lock the cover to the steering wheel when in intermediate position, and to remain out of contact with the wheel when in retracted position, means for locking said bar in retracted position, and means for rendering said locking means inoperative when said bar is in intermediate position.

10. The combination of two concentric relatively rotatable members, one of which contains a notch in its periphery, a hub rotatably mounted upon the periphery of said notched member and having a notch upon its inner edge, a longitudinally movable bar mounted upon said other rotary member and adapted to enter the aperture formed by said notches when said notched rotary member, said hub and said other rotary member are in predetermined angular relation, means for setting said hub with its notch in alignment with said bar, means for locking said bar in retracted position with its end spaced from said notched rotary member and out of engagement with said disc, means for locking said bar in advanced position with its end inserted in the aperture formed by said notches, and means for rendering said locking mechanism inoperative when said bar is in intermediate position with its end in contact with the surface of said notched rotary member and in engagement with the notch in said hub.

11. The combination of two concentric relatively rotatable members, one of which contains a notch in its periphery, a hub rotatably mounted upon the periphery of said notched member and having a notch in its inner edge, a longitudinally movable bar mounted upon said other rotary member and adapted to enter the aperture formed by said notches when said notched rotary member, said hub and said other rotary member are in predetermined angular relation, a lip projecting longitudinally from the end of said bar, means for setting said hub with its notch in alignment with said bar, means for locking said bar in retracted position with its end spaced from said notched rotary member and its lip out of engagement with said hub, means for locking said bar in advanced position with its end inserted in the aperture formed by said notches, and means for rendering said locking mechanism inoperative when said bar is in intermediate position with its end in contact with the surface of said notched rotary member and its lip in the notch of said hub.

12. In mechanism for locking steering wheels, the combination of a steering member, a fixed casing surrounding said steering member, a steering wheel and a cover rotatably mounted upon said steering member and enclosing the upper end thereof, locking mechanism adapted to connect said steering wheel with said steering sleeve, and screws retaining said cover, said wheel and said locking mechanism being so arranged that their heads cannot be reached without moving said steering sleeve longitudinally of said casing.

In testimony whereof I have hereunto set my hand in the presence of two subscribing witnesses.

GANDOLFO CIPRIANO.

Witnesses:
ETHEL JOHNES,
MAISIE MAURUS.